United States Patent
Kotagiri et al.

(10) Patent No.: US 9,522,424 B2
(45) Date of Patent: Dec. 20, 2016

(54) CONTROLLED PRESSURE CASTING

(71) Applicants: Seetarama S. Kotagiri, Rochester Hills, MI (US); Timothy W. Skszek, Saline, MI (US); Frank A. Horton, Rochester Hills, MI (US); Gregory P. Kiselis, Oak Ridge, NC (US)

(72) Inventors: Seetarama S. Kotagiri, Rochester Hills, MI (US); Timothy W. Skszek, Saline, MI (US); Frank A. Horton, Rochester Hills, MI (US); Gregory P. Kiselis, Oak Ridge, NC (US)

(73) Assignee: Magna International Inc. (CA)

( * ) Notice: Subject to any disclaimer, the term of this patent is extended or adjusted under 35 U.S.C. 154(b) by 81 days.

(21) Appl. No.: 14/518,837

(22) Filed: Oct. 20, 2014

(65) Prior Publication Data

US 2015/0035245 A1 Feb. 5, 2015

Related U.S. Application Data

(60) Division of application No. 12/871,329, filed on Aug. 30, 2010, now Pat. No. 8,899,624, which is a
(Continued)

(51) Int. Cl.
| | |
|---|---|
| *B62D 21/00* | (2006.01) |
| *B22D 19/16* | (2006.01) |
| *B60R 19/34* | (2006.01) |
| *B62D 21/11* | (2006.01) |
| *B60B 35/06* | (2006.01) |

(Continued)

(52) U.S. Cl.
CPC .............. *B22D 19/16* (2013.01); *B60B 35/06* (2013.01); *B60G 3/02* (2013.01); *B60K 5/12* (2013.01); *B60R 19/03* (2013.01); *B60R 19/34* (2013.01); *B62D 21/03* (2013.01); *B62D 21/11* (2013.01); *B60G 2206/11* (2013.01); *B60G 2206/60* (2013.01); *B60G 2206/8101* (2013.01); *Y10T 428/12292* (2015.01); *Y10T 428/12972* (2015.01)

(58) Field of Classification Search
CPC ..... B22D 19/00; B60G 7/001; B60G 2206/11; B60G 2206/7102; B60G 2206/30
USPC ........ 280/781, 93.511, 93.512; 164/112, 120
See application file for complete search history.

(56) References Cited

U.S. PATENT DOCUMENTS

| | | |
|---|---|---|
| 3,664,410 A | 5/1972 | Groteke |
| 4,779,666 A | 10/1988 | Ruhlandt et al. |

(Continued)

*Primary Examiner* — Toan To
(74) *Attorney, Agent, or Firm* — Dickinson Wright PLLC

(57) ABSTRACT

An automotive component including a composite casting is provided. The composite casting includes a steel member and an end cap fastened to an end portion of the steel member. A cast coupling member is cast about the end portion of the steel member including the end cap, thereby positively and rigidly securing the cast coupling member to the steel member. The automotive component can comprise an engine cradle, a control arm, an instrument panel support structure, a bumper assembly, or a twist axle. The cast coupling member is typically formed by casting-in-place aluminum about the end cap and the end portion of the steel member. The steel member is typically a tubular member, and the end cap typically includes a flange designed to provide a mechanical interlock surface with the cast coupling member. For example, the flange can have a polygonal shape, an outwardly extending member, or notches.

20 Claims, 13 Drawing Sheets

Related U.S. Application Data continuation-in-part of application No. 11/913,736, filed as application No. PCT/CA2006/000820 on May 19, 2006, now Pat. No. 7,806,162.

(60) Provisional application No. 60/682,329, filed on May 19, 2005.

(51) Int. Cl.
- *B60G 3/02* (2006.01)
- *B60K 5/12* (2006.01)
- *B60R 19/03* (2006.01)
- *B62D 21/03* (2006.01)

(56) References Cited

U.S. PATENT DOCUMENTS

| | | | | |
|---|---|---|---|---|
| 5,143,141 | A * | 9/1992 | Frulla | B22D 18/02 164/120 |
| 5,730,205 | A * | 3/1998 | Thomas | B22D 18/02 164/319 |
| 5,979,201 | A | 11/1999 | Horton et al. | |
| 6,014,879 | A | 1/2000 | Jaekel et al. | |
| 6,065,502 | A | 5/2000 | Horton | |
| 6,474,534 | B2 | 11/2002 | Gabbianelli et al. | |
| 6,609,301 | B1 | 8/2003 | Morris et al. | |
| 6,654,995 | B1 * | 12/2003 | Wang | B21D 39/04 219/93 |
| 6,662,611 | B2 | 12/2003 | Janssen et al. | |
| 7,024,897 | B2 * | 4/2006 | Pfaffmann | B21D 26/033 148/520 |
| 7,967,308 | B2 * | 6/2011 | Toepker | B21D 53/88 280/124.106 |
| 8,496,258 | B2 * | 7/2013 | Werner | B22D 19/00 280/124.116 |
| 8,899,624 | B2 * | 12/2014 | Kotagiri | B60R 19/34 164/111 |

\* cited by examiner

CONTROLLED PRESSURE CASTING

CROSS REFERENCE TO RELATED APPLICATIONS

This U.S. Divisional Patent Application claims the benefit of U.S. Continuation-In-Part patent application Ser. No. 12/871,329 filed Aug. 30, 2010 which claims the benefit of U.S. patent application Ser. No. 11/913,736 filed Dec. 14, 2007, which claims the benefit of U.S. Provisional Patent Application Ser. No. 60/682,329 filed May 19, 2005. The entire disclosures of the applications being considered part of the disclosure of this application, and hereby incorporated by reference.

FIELD OF THE INVENTION

The present invention relates to automotive components, such as engine cradles, control arms, instrument panel support structures, bumper assemblies, and twist axels. More specifically, the present invention relates to automotive components including composite castings.

BACKGROUND

Conventional aluminium high-pressure die casting utilizes a hydraulic cylinder to advance a shot tip, displacing molten aluminium from the shot sleeve into the die cavity, overcoming the resistance to flow through the restricted gate area. When the die cavity is filled with molten aluminium, the pressure applied to the hydraulic shot cylinder is transferred to the molten aluminium based upon the ratio of the shot cylinder and shot tip cross-sectional area. If the die cavity containing one end of a submerged member fills and becomes pressurized before the die cavity or region of the die containing the opposing end of the submerged member, a resultant force is imposed on the end of the submerged member. To avoid movement of the submerged member, a mechanism must be employed, such as a clamp or a friction or form fitting die, to resist the force. As the cross-sectional area of the member increases, the forces become very high and difficult to manage with such mechanisms. Subsequent to filling of the die cavity, the pressure applied to the hydraulic cylinder advancing the shot tip is typically increased (i.e., intensified) by, for example, a factor of two times to reduce the volume of entrapped air and increase the rate of heat transfer. Also, once the in-gates have frozen-off through solidifying, which usually occurs prior to the solidifying of the entire die cavity, even the increased pressure fails to reach the material within the cavities being molded.

U.S. Pat. No. 3,664,410 to Groteke and U.S. Pat. No. 4,779,666 to Ruhlandt et al., disclose each a die casting process and apparatus.

SUMMARY OF THE INVENTION

The invention provides an automotive component including a composite casting. The composite casting includes a steel member and an end cap fastened to an end portion of the steel member. A cast coupling member is cast about the end portion of the steel member including the end cap, thereby positively and rigidly securing the cast coupling member to the steel member.

In one embodiment, the automotive component is an engine cradle for a motor vehicle comprising a frame assembly having a pair of spaced rails secured by spaced cross members, wherein at least one of the spaced rails and the spaced cross members includes the composite casting.

According to another embodiment, the automotive component is a control arm including the composite casting, wherein the steel member is curved in a longitudinal direction.

In another embodiment, the automotive component is an instrument panel support structure, wherein the composite casting is in the form of a cross beam, and a mount is positioned on each end of the composite casting.

In yet another embodiment, the automotive component is a bumper assembly including a plurality of the end caps, and the steel member forms a longitudinally extending steel bumper member constructed to protect the vehicle from impact. The coupling members form first and second aluminum members attached to the steel bumper member, the steel bumper member extends between the first and second aluminum members, and the first and second aluminum members are positioned between the steel bumper member and the space frame of the vehicle.

In another embodiment, the automotive component is a twist axle including a steel torsion beam, an end cap fastened to an end portion of the steel torsion beam, and a cast trailing arm cast abut the end portion of the steel torsion beam including the end cap, thereby positively and rigidly securing the cast trailing arm to the steel torsion beam.

Other aspects, features, and advantages of this invention will become apparent from the following detailed description when taken in conjunction with the accompanying drawings, which are a part of this disclosure and which illustrate, by way of example, the principles of this invention.

BRIEF DESCRIPTION OF THE DRAWINGS

The accompanying drawings facilitate an understanding of the various embodiments of this invention. In such drawings.

DESCRIPTION OF THE ILLUSTRATED EMBODIMENTS

Figure 1:
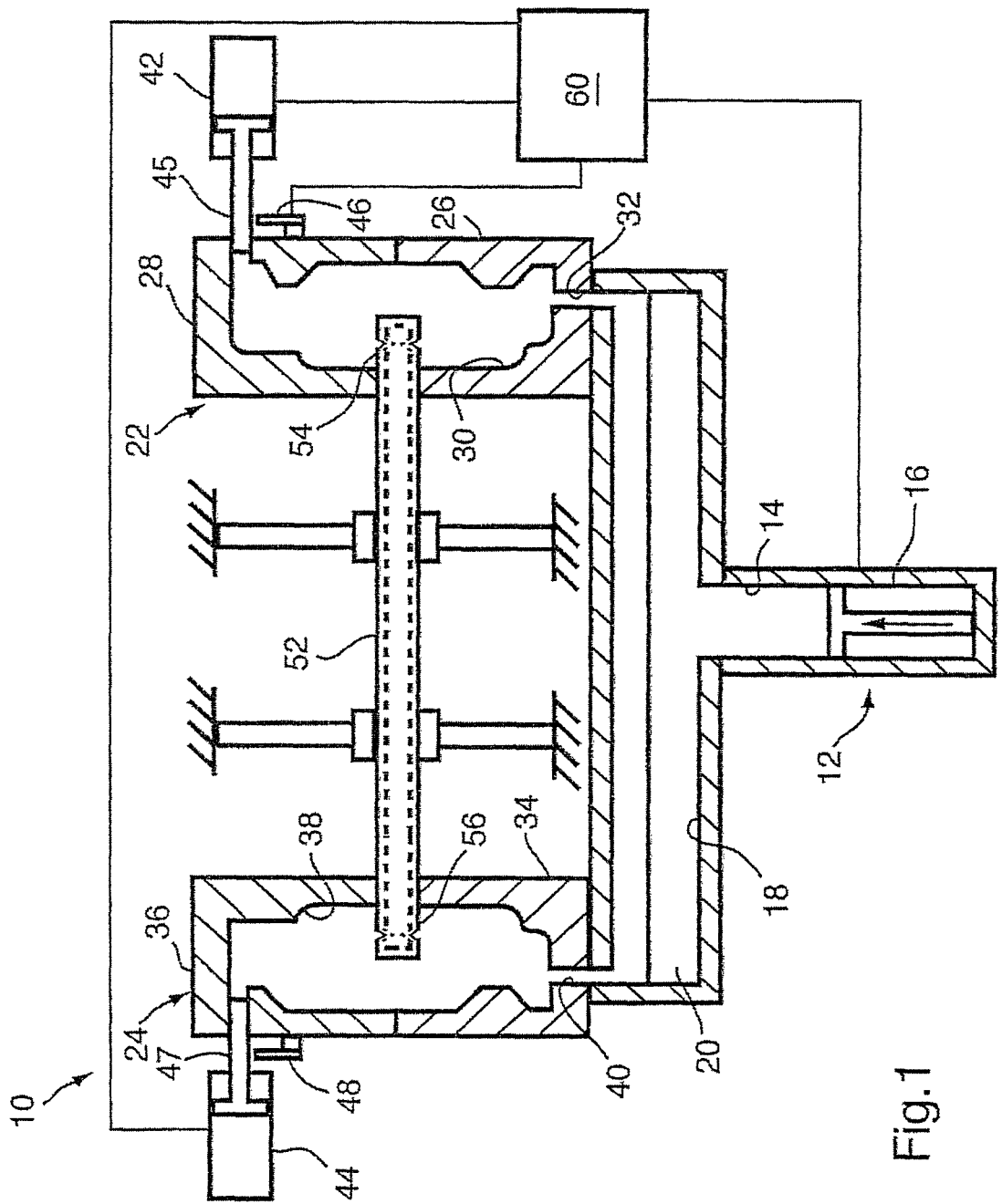
FIG. 1 illustrates a schematic of one illustrated embodiment of the present invention.

FIGS. 1-5 illustrate one embodiment of the present invention. FIG. 1 illustrates, schematically an assembly 10 for casting metal parts, such as a vehicle cradle 50 as seen in FIG. 6. The assembly 10 includes a main or shot tip pressure source 12 illustrated in the form of a shot tip 14 and a hydraulic cylinder 16. The shot tip 14 is fluidly coupled to a reservoir or biscuit 18 and contains, along with the reservoir 18 a quantity of molten metal 20. The reservoir 18 forms a shot sleeve that is fluidly connected to two die assemblies 22 and 24. Die assembly 22 is comprised of at least two die elements 26 and 28, which form a first die cavity or casting area 30. Die assembly 22 has a restricted in-gate area 32 that is fluidly coupled to the shot sleeve 18 such that molten metal 20 is capable of being forced through in-gate 32 and into cavity 30. Similarly, die assembly 24 is comprised of at least two die elements 34 and 36, which form a second die cavity or casting area 38. Die assembly 24 has a restricted in-gate area 40 that is fluidly coupled to the shot sleeve 18 such that molten metal 20 is capable of being forced through in-gate 40 and into cavity 38.

In the Figures, the die assemblies 22 and 24 have been illustrated as separate assemblies. It is apparent to those skilled in the art that the die assemblies 22 and 24 can be combined into a single die assembly. The intermediate section between the two die assemblies can be utilized to provide support to the support member 52, as described below.

Each die assembly 22 and 24 has at least one auxiliary pressure source 42 and 44, respectively, that is attached to a point in the respective cavity 30, 38 that is remote or distal from the in-gates 32, 40. Preferably, auxiliary pressure sources 42 and 44 are spaced as far as possible from the in-gates 32, 40 and most preferably on opposite ends of the cavities 30, 38. The auxiliary pressure sources 42 and 44 perform two functions. First, each auxiliary pressure source 42, 44 provides an indication that its respective cavity 30, 38 is sufficiently filled with molten metal 20 and, second, to apply auxiliary pressure to each respective cavity 30, 38 as described below. Auxiliary pressure source 42 is illustrated in the figures as an auxiliary hydraulic cylinder having a piston 45 that is connected directly to the die cavity 30. Piston 45 operatively communicates with the cavity 30 and moves in a reciprocating fashion to define an expanded volume and a desired volume.

Movement of the piston 45, including movement caused by molten metal 20 filling cavity 30, can be monitored in various ways. FIG. 1 illustrates a limit switch 46 adjacent piston 45 to track its movement in and out of the die cavity 30. Auxiliary pressure source 44 is also illustrated in the figures as an auxiliary hydraulic cylinder having a piston 47 that is operatively connected directly to the die cavity 38. Movement of the piston 47, including movement caused by molten metal 20 filling cavity 38, can be monitored in various ways, but is illustrated as a limit switch or position sensor 48 adjacent piston 47 to track its movement in and out of the die cavity 38.

In the illustrated embodiment of FIG. 1, the composite or hybrid casting assembly is casting the ends of a vehicle cradle 50, which has multiple support members 52, 84 extending between multiple castings 80, 82, as seen in FIG. 6. In FIG. 1, only one support member 52 is illustrated but it should be understood that the other support members can be made in a substantially identical manner or in different configurations, as desired, such as seen in FIG. 6. Support member 52 can take various configurations, but is typically a tubular member, such as a high strength steel, hollow tube. Tubes such as tube 52 can be made by operations such as hydroforming, preferably according to known methods as described in U.S. Pat. Nos. 5,979,201; 6,014,879; 6,065, 502; 6,474,534; 6,609,301; and 6,662,611.

To form cradle 50, tube 52 is to have a casting on each of two ends 54 and 56 of the tube 52. Die assembly 22 has been configured to provide the casting for end 54 and die assembly 24 has been configured to provide the casting for end 56. Although FIG. 1 only shows only tube 52 extending into cavities 30 and 38, multiple tubes such as tube 52 may extend into each of cavities 30 and 38 and become integral with the castings produced by die assemblies 22 and 24, as seen in FIG. 6.

The ends 54 and 56 of tube 52 extend into each cavity 30 and 38, respectively, and each end 54, 56 is closed so that molten metal 20 does not enter the hollow tube 52. FIGS. 11 to 17 illustrate various examples of hollow tubes with a closed end. The various examples provide two functions: closing the end of the hollow tube and providing a mechanical interlock between the casting to be formed and external surface of the hollow tube. The mechanical interlock prevents relative movement, torsional and axial, between the hollow tube and the casting. The mechanical interlock is enhanced by providing a mechanical interlock surface.

Figure 11:
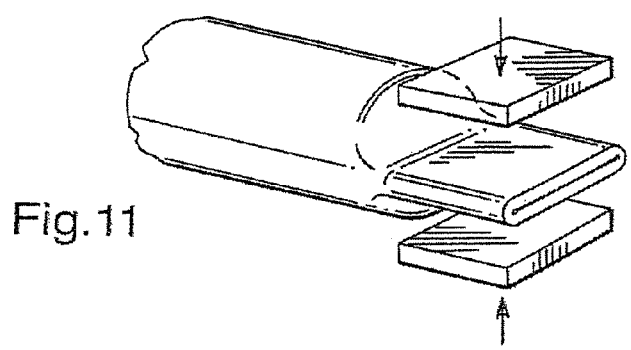
FIGS. 11-17 illustrate various examples of tube end closing and mechanical interlock for use with the present invention.

In FIG. 11, the tube end is crushed between two dies to present a flat end that is wider than the tube. A hole is provided through the flat end to present an interlock surface.

Figure 12:
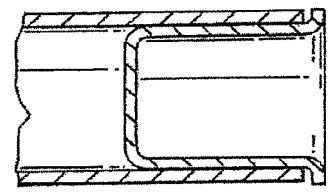

In FIG. 12, a separate stamped cap is positioned in the inside of the tube, closing the end. The cap is tack welded or crimped to the tube. The cap may have a flange having a non-circular configuration to provide a mechanical interlock surface.

Figure 13:
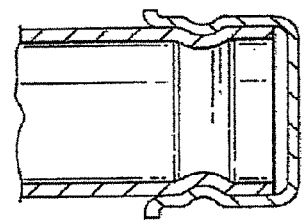

In FIG. 13, a separate stamped cap is positioned in the outside of the tube, closing the end. The cap is tack welded or crimped to the tube. The cap may have a flange having a non-circular configuration to provide a mechanical interlock surface.

Figure 14:
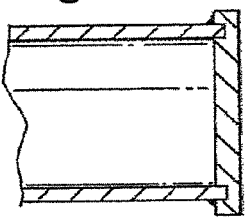

In FIG. 14, a separate stamped cap is positioned on the end of the tube, closing the end. The cap is welded to the tube. The cap may have a flange or tang having a non-circular configuration to provide a mechanical interlock surface.

Figure 15:
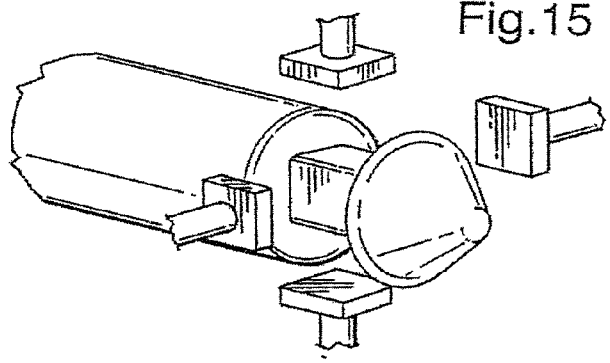

In FIG. 15, the tube end is subjected to rotary swaging to shape the end in a bayonet shape.

Figure 16:
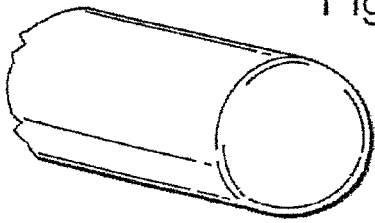

In FIG. 16, the material is spun around the ends of the tube, with indents provided on the tube.

Figure 17:
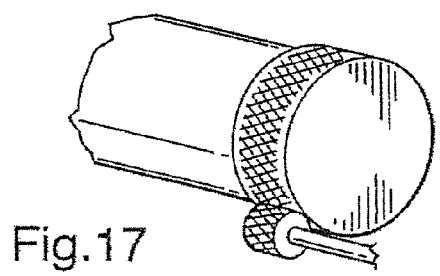

In FIG. 17, an end cap is welded to the end of the tube and a knurl is applied to the outside surface of the tube to present a mechanical interlock surface.

Figure 18:
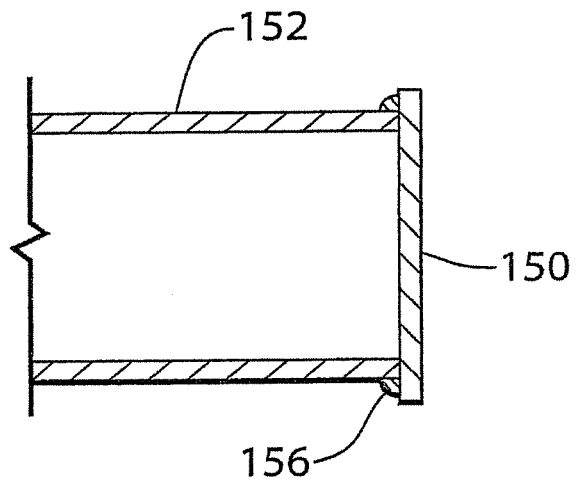
FIG. 18 illustrates an end cap fastened to an end portion of a steel member according to an exemplary embodiment.
Figure 19:
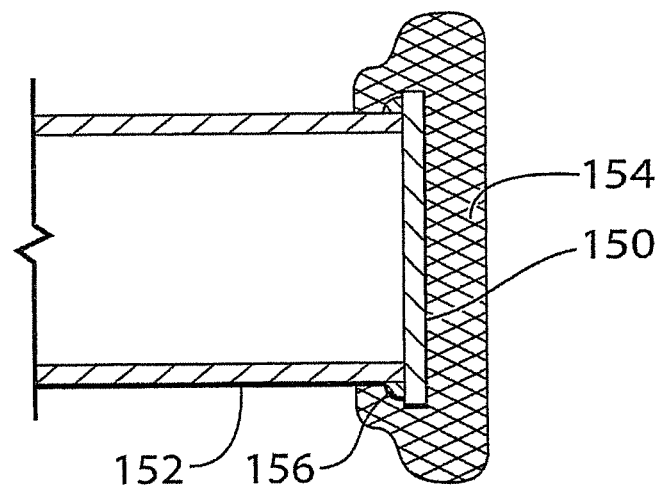
FIG. 19 illustrates a cast coupling member cast about the end portion of the steel member shown in FIG. 18.

FIG. 18 shows a flat end cap 150 abutting with an end portion of a steel member 152. In accordance with the embodiment shown in FIG. 18, the steel member is a tubular member. The end cap is fastened to the end portion of the steel member 152 by means of welding as indicated by welding seam 156. Alternative methods of fastening the end cap can be employed, such as crimping. Once the end cap 150 is fastened to the steel member 152, a cast coupling member 154 is casted about the end portion of the steel member enclosing the end cap 150. The end cap 150 prevents the molten metal from flowing into the steel member 152 and simultaneously positively and rigidly locks and secures the cast coupling member to the steel member, as shown in FIG. 19.

Figure 20A:
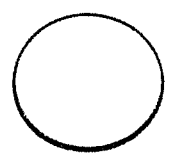
FIGS. 20a, 20b, 20c, 20d and 20e illustrate exemplary end cap designs for fastening to the end portion of the steel member.
Figure 20B:
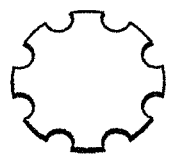
Figure 20C:
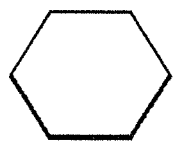
Figure 20D:
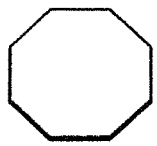
Figure 20E:
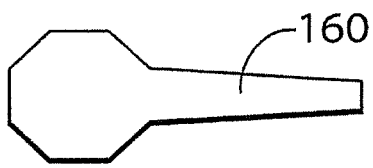

FIGS. 20*a-e* show exemplary embodiments of end cap designs. As can be seen from these figures, the end cap has a flange having a circular (FIGS. 20*a-b*) or a non-circular configuration (FIGS. 20*c-e*). In accordance with the embodiment shown in FIG. 20*b*, notches are provided along the flange to provide an additional mechanical interlock surface. FIGS. 20*c-e* show examples of polygonal end cap configurations. For example, FIG. 20*c* shows a hexagonal end cap configuration and FIG. 20*d* shows an octagonal end cap configuration. In accordance with the embodiment presented in FIG. 20*e*, the end cap has a flange having a polygonal shape including an outwardly extending member 160. The outwardly extending member 160 can generate additional torque which is advantageous for high torque applications, such as for example in twist beam applications.

Figure 21:
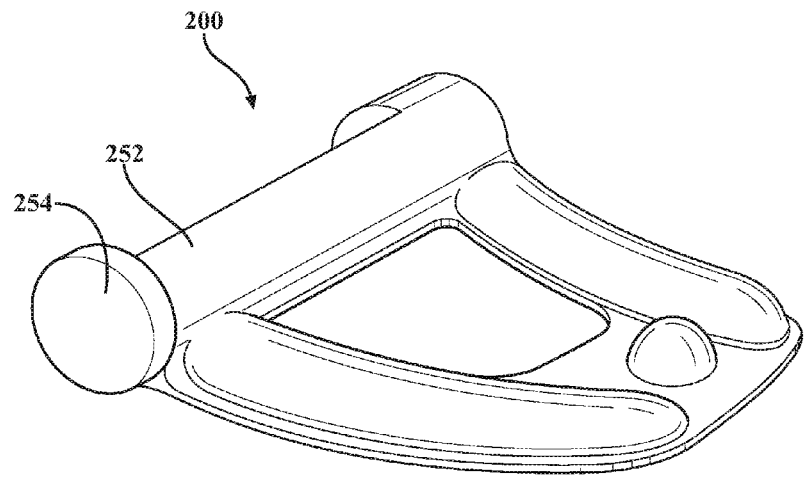
FIG. 21 illustrates an example of a control arm according to an example embodiment.
Figure 22:
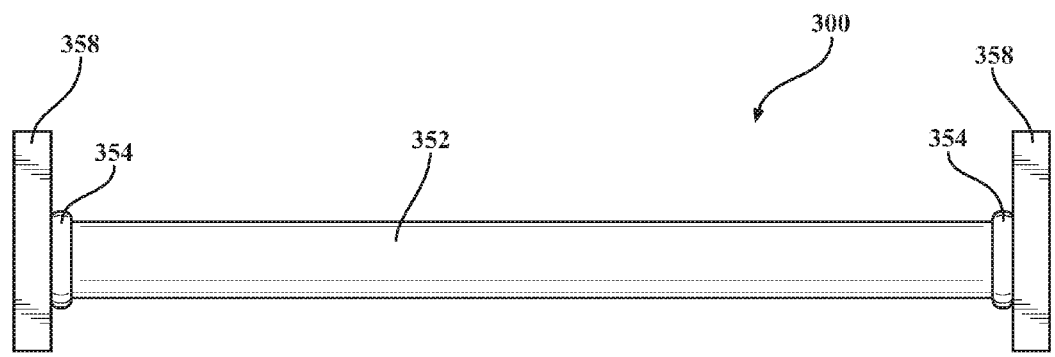
FIG. 22 illustrates an example of a support structure for an instrument panel according to an example embodiment.
Figure 23:
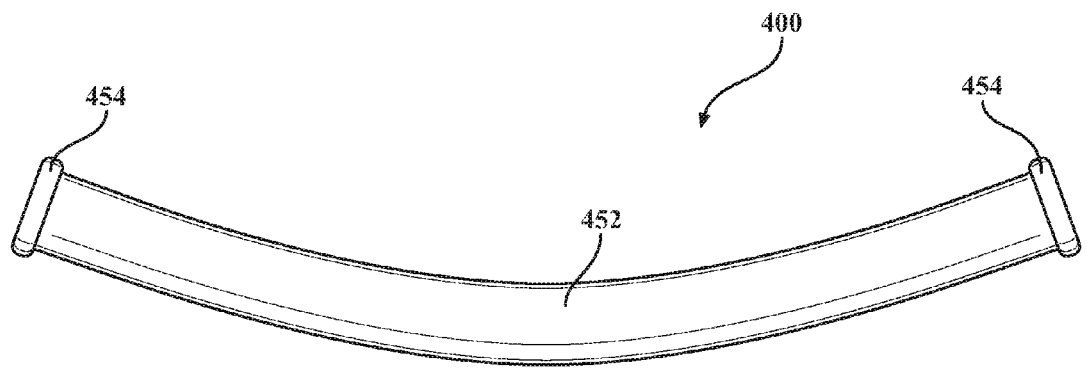
FIG. 23 illustrates an example of a bumper assembly according to an example embodiment.
Figure 24:
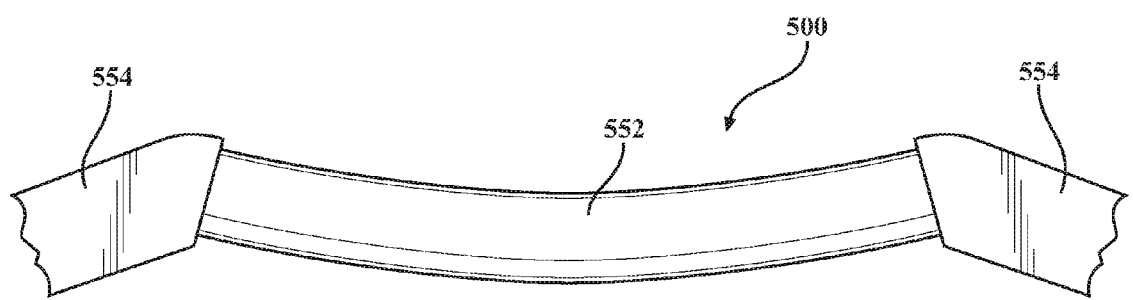
FIG. 24 illustrates an example of a twist axle beam according to an example embodiment.

The end cap 150 and cast coupling member 154 can be used in various types of structural components for motor vehicles, including engine cradles, control arms, instrument panel support structures, bumper assemblies, and twist axles. As discussed above, FIG. 6 illustrates an example of the engine cradle 50. FIG. 21 illustrates an example of the control arm 200 including the steel member 252 curved in a longitudinal direction, wherein the end cap is fastened to an end portion of the steel member 252, and the cast coupling member 254 is cast about the end portion of the steel member including the end cap. FIG. 22 includes an example of a support structure 300 for an instrument panel including the steel member 352, wherein the end cap is fastened to an end portion of the steel member 352, and the cast coupling member 354 is cast about an end portion of the steel member 352 enclosing the end cap. In this embodiment, the steel member 352 is disposed between a pair of mounts 358. FIG. 23 includes an example of a portion of a bumper assembly 400 constructed to protect the vehicle from impact. The bumper assembly 400 includes the steel member 452, end caps fastened to the end portions of the steel member 452, and a cast coupling member 454 cast about each end portion of the steel member 452 enclosing the end caps. The cast coupling members 454 are formed of aluminum and can be positioned between the steel member 452 and a space frame of the vehicle. FIG. 24 includes an example of a twist axle beam 500, wherein the steel member 552 is a torsion beam, and the end cap is fastened to an end portion of the steel torsion beam. In this embodiment, the cast coupling member 554 is a trailing arm cast about the end portion of the torsion beam including the end cap.

Each of the die assemblies 22 and 24 has a tube-receiving opening 55 and 57 and the split or parting line between die elements 26, 28 and 34, 36, respectively. Tube-receiving openings 55 and 57 are configured to complementarily receive tube ends 54, 56 respectively in a friction or interference fit. The tube-receiving openings 55 and 57 will clamp and retain the tube 52 in place after the die elements 26, 28 and 34, 36, respectively, have been closed. Although tube 52 has been illustrated as being straight and symmetrical, hydroforming enables tube of complex geometries be utilized in the present invention. To enhance the clamping capabilities, an intermediate die between the die assemblies 22, 24, can be provided to receive the tube 52 and provide support thereto, retaining the tube 52 is position during the casting process.

Preferably, the assembly 10, as illustrated in FIG. 1, is controlled by controller 60, which may take the form of a computer-based controller assembly or other automated or manually monitored controller assembly. Controller 60 can monitor and control the main pressure 12, the auxiliary pressures 42 and 44, and filling of the cavities 30 and 39. In the illustrated embodiment, the filling of the cavities can be monitored by controller 60 monitoring the sensors or limit switches 46 and 48.

The operation of the embodiment illustrated in FIG. 1 is best illustrated by viewing FIG. 1 in combination with FIGS. 2-5. The tube 52 is positioned in the casting assembly 10 such that first end 54 of tube 52 is positioned within first mold 22 and a second end 56 of the tube 52 is positioned within second mold 24.

Figure 2:
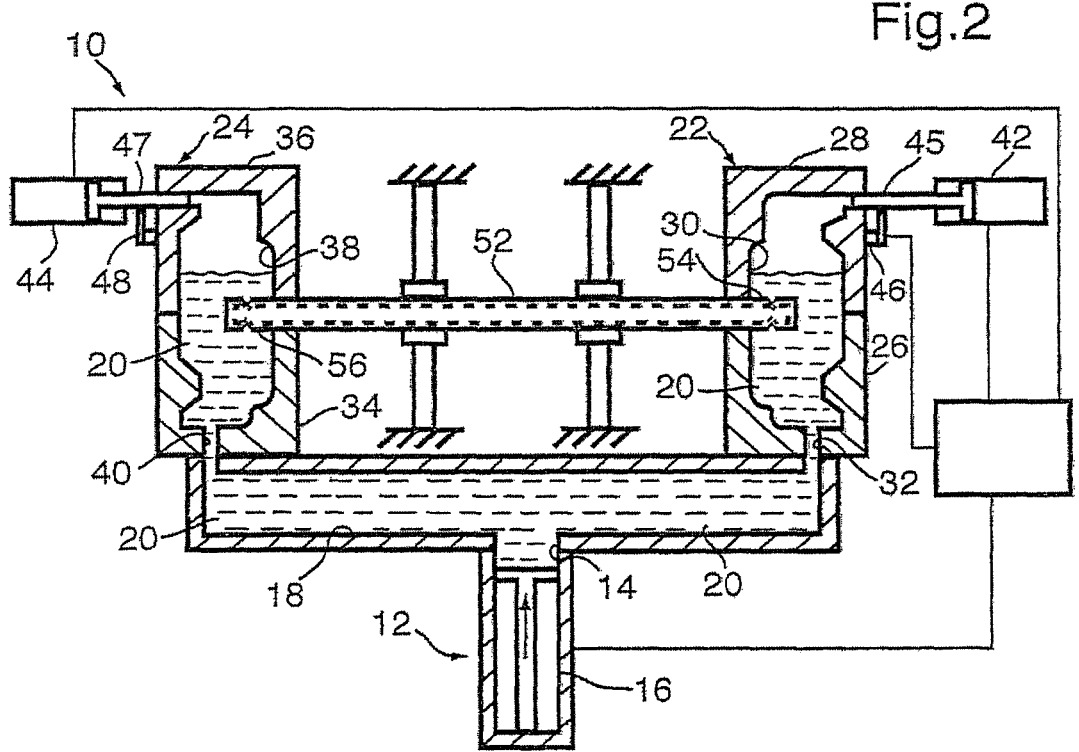
FIG. 2 illustrates the embodiment of FIG. 1 with the molten metal partially filling the molds.

The first and second molds 22 and 24 are fluidly coupled to reservoir 18 of molten metal 20. A main pressure is applied by hydraulic cylinder 16 and the molten metal 20 in reservoir 18 is forced into the first mold cavity 30 through in-gate 32 and simultaneously into the second mold cavity 38 through in-gate 40. The amount of pressure needed from cylinder 16 to fill the cavities 30 and 38 is preferably merely the pressure to overcome the resistance of pushing the molten metal 20 through the restricted in-gates 32 and 40. Thus, main pressure is applied by cylinder 16 to the molten metal 20 in the reservoir 18 at an initial, mold-filling pressure to force or inject the molten metal 20 into the mold cavities 30 and 38. As seen in FIG. 2, as the molten metal 20 begins filling the cavities 30 and 38, the molten metal 20 encapsulates the ends 54 and 56 of tube 52.

The molten metal 20 is preferably aluminium. At the moment of injection, the molten metal 20 preferably contains about 40-50% solids at less than 600° C., most preferably 583-595° C.

Figure 3:
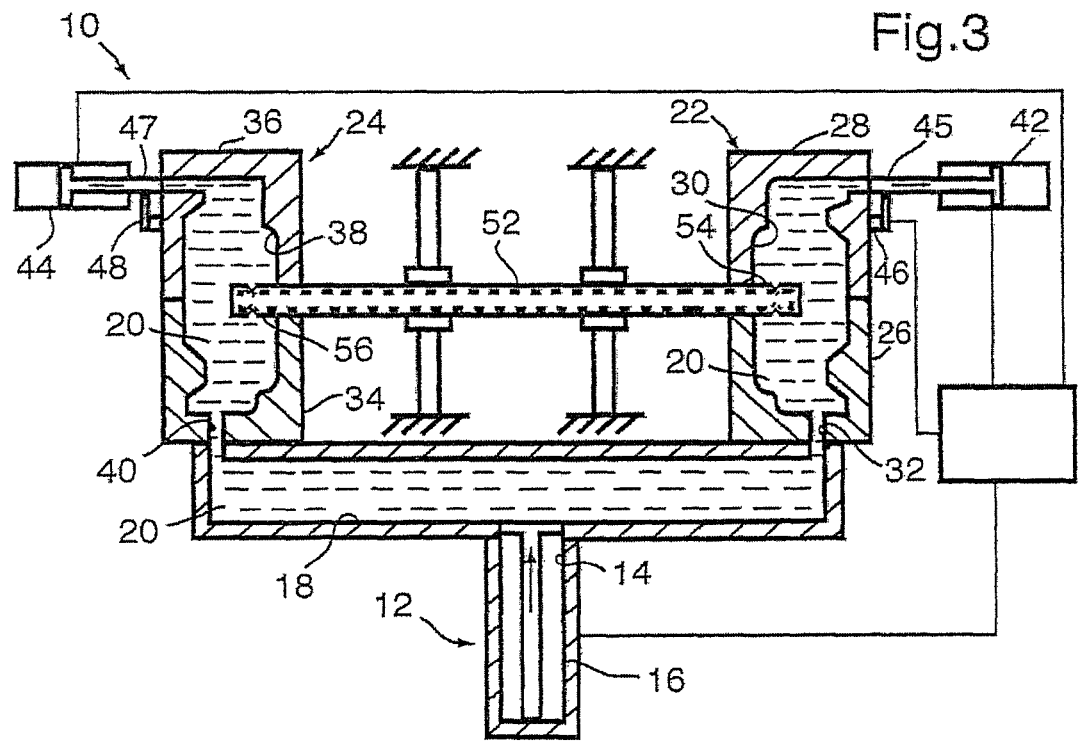
FIG. 3 illustrates the embodiment of FIG. 1 with the molten metal completely filling the molds.

As seen in FIG. 3, the cylinder 16 continues applying the initial filling pressure and the molten metal 20 completely fills each of the mold cavities 30 and 38. The pistons 45, 47 for the auxiliary cylinders 42, 44 are free to move with the molten metal 20. The molten metal 20 contacts the pistons 45, 47, and urges the pistons 45, 47 outwardly, increasing the volume of the cavities 30, 38 such that the volume of each cavity is increased to an expanded volume. Pistons 45, 47 are pushed and displaced by the molten metal 20.

The displacement of the piston 45 and 47 may be measured or observed in any variety of ways well known in the art, such as by position sensor or limit switches 46, 48, respectively. Limit switches 46 and 48 each generate a respective fill signal once the piston 45, 47 has traveled a predetermined amount. The fill signal is transmitted to the controller 60 which responsively activates the auxiliary power sources 42 and 44.

Other devices or mechanisms can be used to determine when the cavities 30 and 38 are filled. Those devices may be integral or separate from the auxiliary pressure sources 42 and 44 or interactively connected such as illustrated. For example, after experimentation with the process to determine how much time it takes to fill each cavity 30 and 38, the timing routine may be established wherein pressures of the main 16 and auxiliary cylinders 42 and 44 are turned on and off based on a predetermined timing sequence. Also, a computer controlled system using controller 60 may be used to automatically monitor the position sensors or limit switches 46, 48 or other monitoring devices or methodologies to determine when the cavities 30 and 38 are filled and when to activate the auxiliary cylinders 42 and 44 and to control the main cylinder 16. Auxiliary cylinders 42 and 44 provide merely one mechanism for determining the fill of the cavities 30 and 38 and other mechanisms can be used that are part of or separate from the auxiliary pressure devices.

Figure 4:
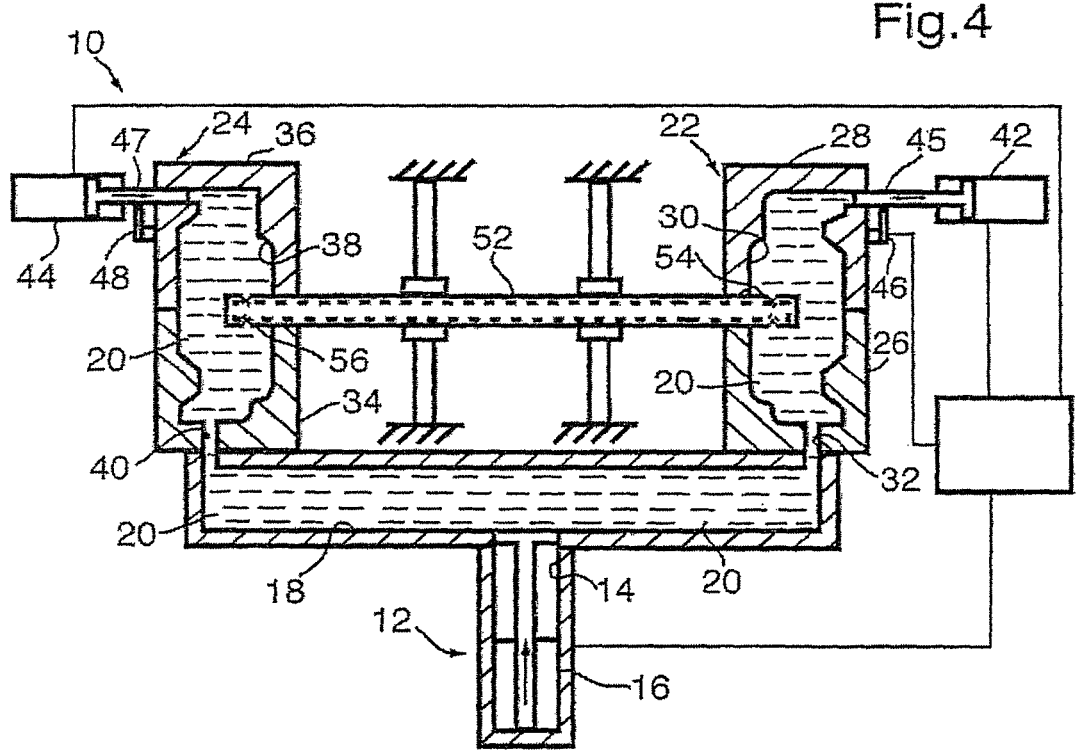
FIG. 4 illustrates the embodiment of FIG. 1 with the auxiliary pressure being applied to the molten metal in the molds.

As seen in FIG. 4, with the main cylinder 16 still applying an initial, fill pressure, or with the main cylinder 16 being turned off or relaxed, the auxiliary cylinders 42 and 44 apply auxiliary pressure to the molten metal 20 in mold cavities 30 and 38, respectively. This application of auxiliary pressure by cylinders 42 and 44 moves the pistons 45, 47 from the expanded volume to a desired volume and thereby injects a small amount of molten metal 20 back into the mold cavities 30 and 38 to compensate for or densify the solidifying metal, which shrinks upon cooling. The cylinders 42, 44 maintain a predetermined pressure on the molten metal 20 in each of the mold cavities 30 and 38 instead of relying solely on the main cylinder 16. Without the use of auxiliary cylinders 42, 44, the main cylinder 16 would necessarily have to be operated to provide a relatively high-pressure once the cavities 30 and 38 were filled with molten metal 20 to provide sufficient pressure on the molten metal 20 in reservoir 18 to continue injection of molten metal 20 into the cavities 30 and 38 during the solidifying stage to ensure that the solidified metal casting conforms to the mold cavity. However, the use of the auxiliary cylinders 42 and 44 permits the main cylinder 16 to apply a relatively lower pressure than in previous casting systems and, as a result, the main cylinder 16 of the subject casting assembly 10 is permitted to be smaller than a main cylinders used in a system without auxiliary pressure supplies 42, 44.

Depending on the casting process being carried out, the main cylinder 16 may continue providing a low pressure to the molten metal 20 during solidification while the necessary pressure on the molten metal 20 for solidifying in cavities 30 and 38 is applied by auxiliary cylinders 42 and 44. Alternatively, the main cylinder 16 may be turned off or relaxed once the auxiliary cylinder 42 and 44 begin applying pressure or at sometime thereafter.

Figure 5:
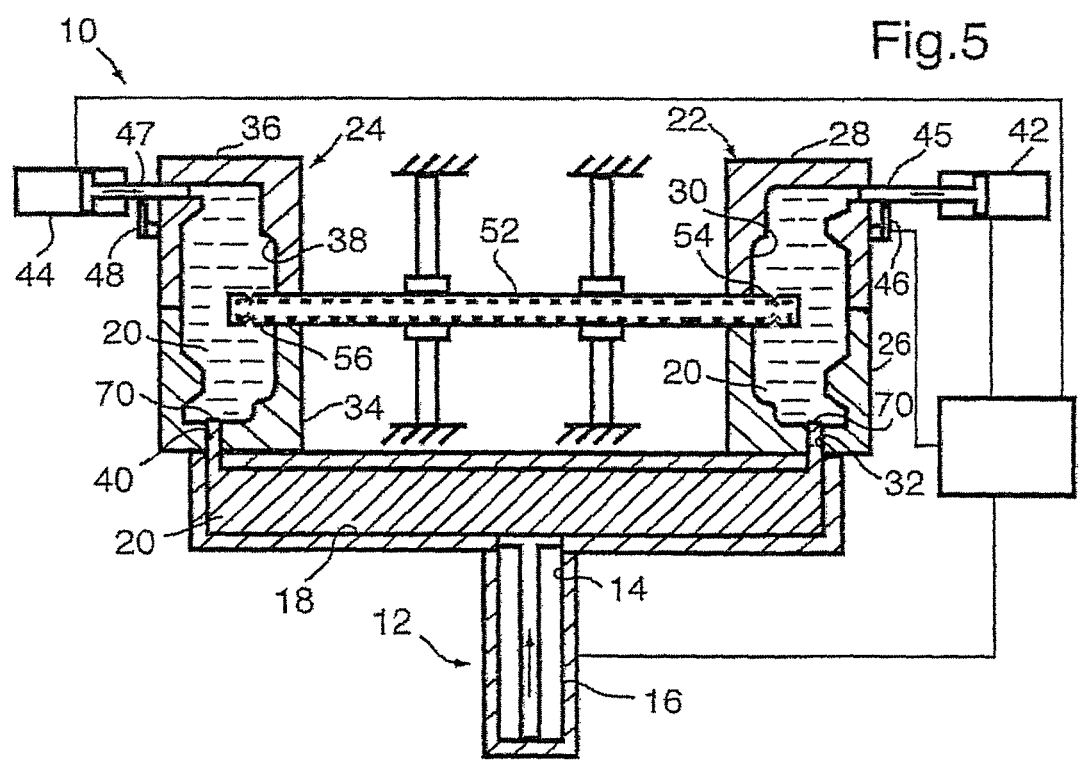
FIG. 5 illustrates the embodiment of FIG. 1 with the molten metal partially solidified, in the reservoir.
Figure 6:
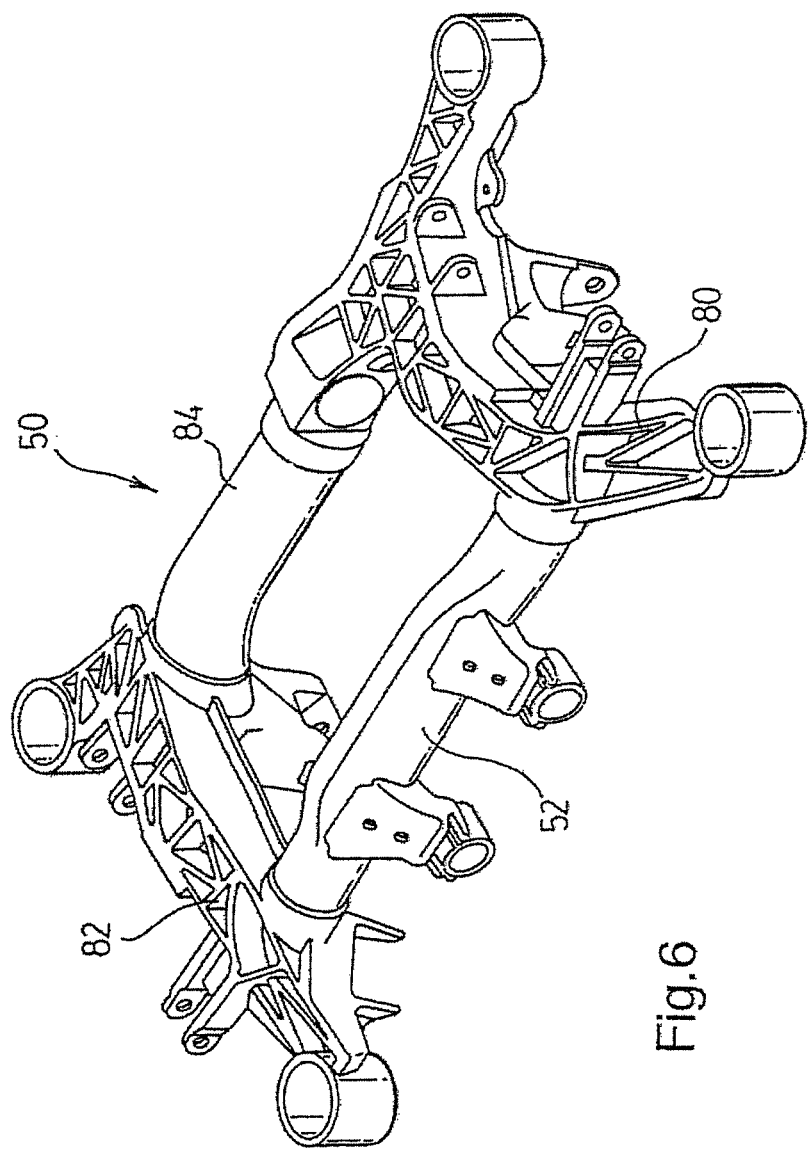
FIG. 6 illustrates a perspective view of an example of a vehicle cradle that may be produced by an illustrated embodiment of the present invention.

Eventually, as seen in FIG. 5, the molten metal 20 begins solidifying. The molten metal 20 may initially begin solidifying at places such as at the in-gates 32 and 40 and in the shot sleeve 18. Once the in-gates 32 and 40 solidify, any pressure applied by the main cylinder 16 will cease to be effective in applying the appropriate pressure to any metal still semi-molten in the cavities 30 and 38. FIG. 5 illustrates a benefit of the auxiliary cylinders 42 and 44 in that each cylinder continues applying pressure to the molten metal in cavities 30 and 38, respectively, even after the in-gates 32 and 40 are blocked by solidified metal 70.

Once the molten metal 20 is completely and sufficiently solidified, the auxiliary cylinders 42 and 44 are turned off and the die elements 26 and 28 and die elements 34 and 36 are opened, respectively, to reveal casts 80 and 82 that are formed from the solidified molten metal 20 in mold cavities 30 and 38, respectively. As seen in FIG. 6, the casts 80 and 82 are rigidly connected to the tubular members 52 and 84 to form, for example, a vehicle cradle 50, such as a cradle front engine cradle or a rear cradle for an automobile, as illustrated.

Figure 7:
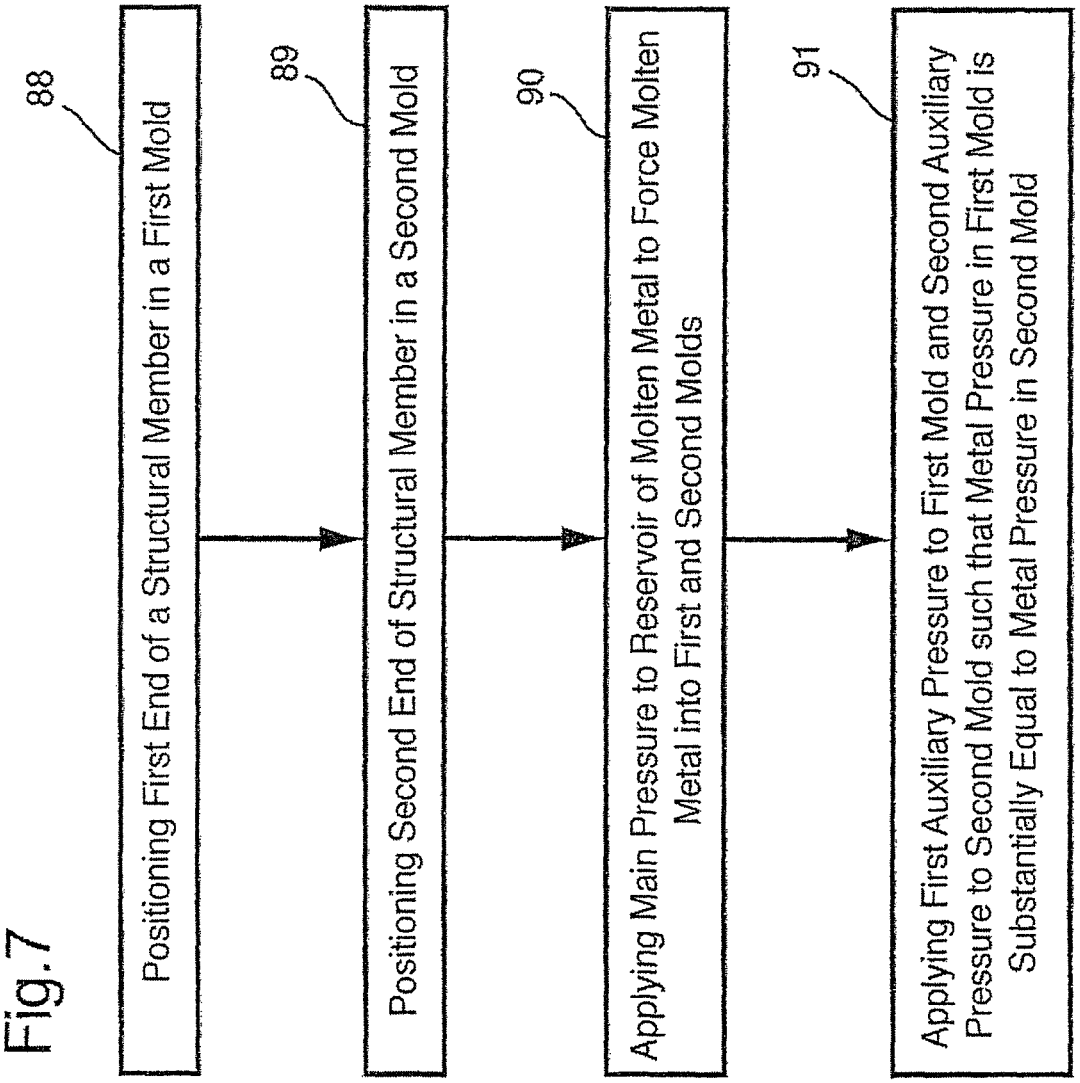
FIG. 7 illustrates a method in accordance with one aspect of the invention.

As seen in FIG. 7, one aspect of forming a metal casting is illustrated in the method of forming metal castings, comprising a position step 88 of positioning a first end 54 of a structural member 52 in a first mold cavity 30; a second positioning step 89 of positioning a second end 56 of the structural member 52 in a second mold cavity 38, the first and second mold cavities 30 and 38 being fluidly coupled to a reservoir 18 of molten metal 20; an applying step 90 of applying a main pressure to the molten metal 20 in the reservoir 18 to force the molten metal 20 into the first mold cavity 30 and the second mold cavity 38; and an applying step 91 of applying a first auxiliary pressure to the molten metal in the first mold cavity 30 and a second auxiliary pressure to the molten metal in the second mold cavity 38 such that the metal pressure in the first mold cavity 30 is substantially equal to the metal pressure in the second mold cavity 38.

Figure 8:
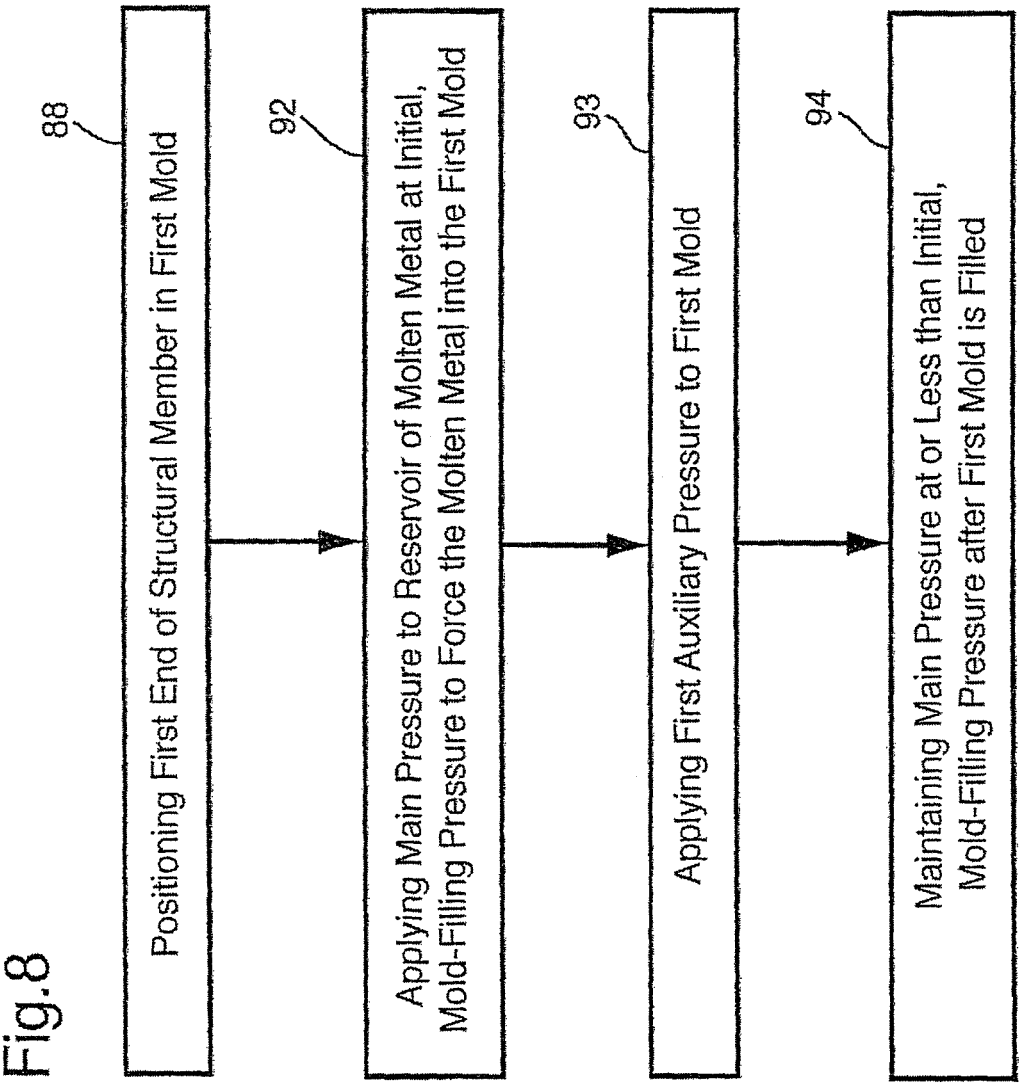
FIG. 8 illustrates a method in accordance with another aspect of the invention.

As seen in FIG. 8, another aspect of forming a composite metal casting is illustrated in the method of forming metal castings, comprising: a positioning step 88 positioning a first end 54 of a structural member 52 in a first mold cavity 30, the first mold cavity 30 being fluidly coupled to a reservoir 18 of molten metal 20; an applying step 92 applying a main pressure to the molten metal 20 in the reservoir 18 at an initial, mold-filling pressure to force the molten metal 20 into the first mold cavity 30; another application step 93 of applying a first auxiliary pressure to the molten metal in the first mold cavity 30; and a maintaining step 94 of maintaining the main pressure at or less than the initial, mold-filling pressure after the first mold cavity 30 has been filled.

Figure 9:
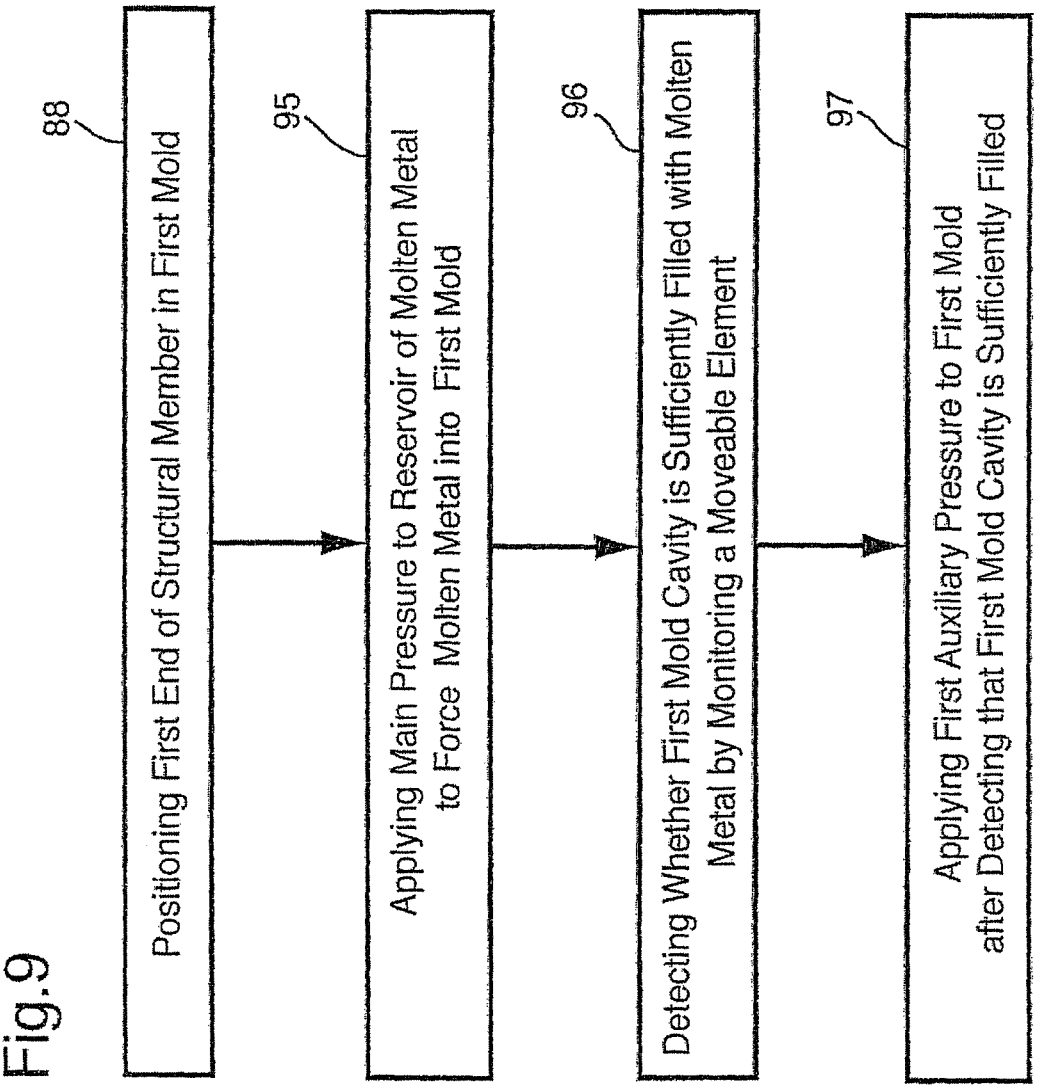
FIG. 9 illustrates a method in accordance with yet another aspect of the invention.

As seen in FIG. 9, another aspect of forming a metal casting is illustrated in the method of forming composite metal castings, comprising: the positioning step 88 of positioning a first end 55 of a structural member 52 in a first mold cavity 30, the first mold cavity 30 being fluidly coupled to a reservoir 18 of molten metal 20; an application step 95 of applying a main pressure to the molten metal 20 in the reservoir 18 to force the molten metal 20 into the first mold cavity 30; a detecting step 96 of detecting whether the first mold cavity 30 is sufficiently filled with molten metal 20 by monitoring a moveable element 45; and an application step 97 of applying a first auxiliary pressure to the molten metal in the first mold cavity after detecting that the first mold cavity 30 is sufficiently filled.

The size of a semi-solid sub-liquidus casting (SLC) machine is defined by the platen size and the clamp tonnage. The platen size determines the largest die dimension that can physically fit under the clamp of the press. The clamp tonnage is defined by the product of the "projected area" times the metal pressure. Metal pressure relative to the size of casting defects and associated material properties is significant up to a metal pressure of 4 tons per square inch. Further increases in metal pressure in excess of 4 tons per square inch are reported to provide little additional value.

In one embodiment of the system of FIGS. 1-5, the sub-liquidus casting (SLC) process semi-solid casting process includes the biscuit or molten metal reservoir 18 (typically 20" diameter) from which molten metal 20 is transferred into the die cavities 30 and 38 via a hydraulic cylinder 16 and shot tip assembly 14. The machine tonnage required is determined by the product of the metal pressure (i.e., approximately 4 tons per square inch) times the sum of the projected area of the shot tip (biscuit) assembly 14 and 18 and the projected area of the castings outside the perimeter if the shot tip biscuit assembly 14, 18.

The SLC process would ordinarily assume that the majority of the casting projected area is located directly above the shot tip/biscuit area. The platen size is thus designed to accommodate a relatively large die, presenting metal pressure and casting projected area (shot tip plus casting area) as the limiting features which define the machine tonnage requirements.

The "controlled pressure" method of the subject application is particularly applicable to the manufacture of "hybrid material" cast automotive components such as cradles which are typically separated by high strength steel tubes. Separation of the castings results in a significant amount of the casting area to be outside of the projected area of the biscuit 18, thus increasing the machine size tonnage requirement of, for example, main cylinder 18. The controlled pressure method utilizes the shot tip assembly 14, 18 to inject metal into the dies 30 and 38 and auxiliary cylinders 42 and 44 provide pressure after the die cavities 30 and 38 are full. This technique results in limiting the metal pressure during the die fill and initial solidification phase to that of the machine clamp tonnage divided by the total projected area associated with the biscuit 14, 18 and casting area 30, 38. Once the cavities 30, 38 are full, the shot tip pressure is reduced and auxiliary cylinders 42 and 44 integral to the die cavities 30 and 38, respectively, are actuated, providing pressure to only the casting projected area.

Specifically, this can be seen when taking a specific rear cradle example:
Conventional SLC Casting Method
Shot tip/biscuit diameter: . . . 20 in
Shot tip/biscuit projected area: . . . 314 in$^2$
Casting projected area (outside perimeter of shot tip) . . . 192 in$^2$
Total projected area (casting & shot tip): . . . 506 in$^2$ (192+314)
Required machine tonnage @ 8,000 psi (4 tons/in$^2$) metal pressure . . . 2,000 ton
Controlled Pressure SLC Casting Method in Accordance with Embodiments of Subject Application
Shot tip/biscuit diameter: . . . 20 in
Shot tip/biscuit projected area: . . . 314 in$^2$
Casting projected area (outside perimeter of shot tip) . . . 192 in$^2$
Metal pressure permitted at end of die fill . . . 2 ton/in$^2$
Required machine tonnage @ 8,000 psi (4 tons/in$^2$) metal pressure . . . 768 ton Thus, when using the method in accordance with the embodiments of the subject application, the required machine tonnage is less than the required machine tonnage using conventional methods and apparatus. The embodiments of the subject application, which are referred to as "controlled pressure" casting, provides the capability to cast components such as a rear cradle or front engine cradle in one casting machine cycle, in a reduced machine tonnage that is relative to only the "saleable" casting projected area (the casts 80, 82 themselves) rather the sum of the projected area of the castings 80 and 82 and biscuit 18.

Figure 10:
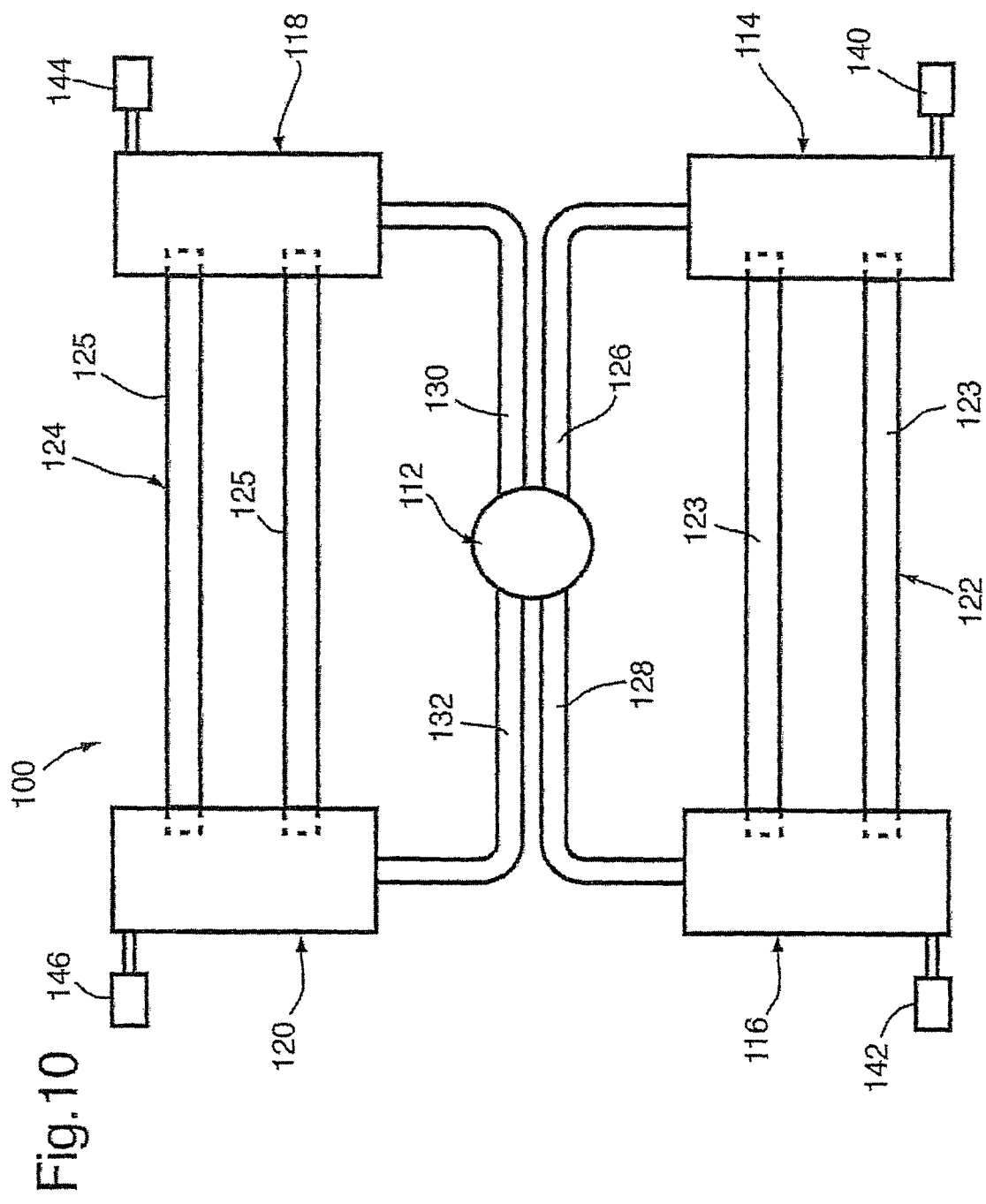
FIG. 10 illustrates a schematic of another embodiment of the present invention wherein four molds are in operation simultaneously to form two vehicle cradles.

FIG. 10 illustrates a casting assembly 110 in accordance with another embodiment of the invention wherein one shot tip pressure assembly 112 supplies molten metal to four casting die assemblies 114, 116, 118, 120 so that two vehicle cradles 122 and 124 may be cast simultaneously. Each vehicle cradle 122 and 124 is shown with two structural members 123 and 125, respectively, and each engine cradle 122 and 124 can be similar to cradle 50 in FIG. 6. The structural members 123 and 125 may be substantially identical to tube 52 in composition and make-up. Of course, the specific shape of any structural members 123 and 125 will vary dependent upon the specific vehicle cradle formed. As mentioned above, such an arrangement as illustrated in FIG. 10 is possible due to the efficiencies of the casting assemblies disclosed herein in the embodiments of the subject application.

In FIG. 10, main pressure assembly 112 is fluidly coupled to the die cavity of each die assembly 114, 116, 118, 120 by shot sleeves 126, 128, 130 and 132, respectively. Each die assembly 114, 116, 118, 120 receives the ends of two structural members 123, 125 so that the castings formed in each die assembly 114, 11, 118, 1220 will encapsulate two ends of the structural members 123 and 125. Each die assembly 114, 116, 118, 120 also has an auxiliary pressure source 140, 142, 144, and 146, which is similar to auxiliary pressure sources 42 and 44 described above. Also, the casting assembly 110 can be controlled by controller 60 in a manner as described above with respect to controller 60. Other than the main pressure 112 supplying molten metal to four die assemblies 114, 116, the configuration of the casting assembly 110 is substantially identical to casting assembly 10 described above.

The embodiment of FIG. 10 illustrates one of the efficiencies of the illustrated embodiments of the subject application. That is, since auxiliary pressures are applied to each die 114, 116, 118, 120 during solidifying, the main pressure supplied to each die 114, 116, 118, 20 by main cylinder 116 is less than the pressures typically applied by main cylinders in prior art casting arrangements. Thus, since the main pressure in the embodiments of the subject application are lower, the size requirements of the pressure system and for the main hydraulic cylinder is less. This permits the embodiments of the subject application to utilize smaller main hydraulic cylinders and smaller pressure requirements. Alternatively, with the same size and pressure constraints found in the prior art, embodiments of the subject application can be used to fill a greater number of die cavities with molten metal 20. For example, wherein the a prior art configuration may only be used to cast one vehicle cradle member, embodiments of the subject application may be used to produce more castings, for example, two cradle assemblies that each require two castings. Thus, whereas the prior art could make, for example, two castings per cycle, the embodiment of FIG. 10 may produce, for example, four casting per cycle using the same pressure and sized machinery.

Thus, embodiments of the subject application utilize a minimum level of hydraulic pressure required to transfer molten metal 20 from the shot sleeve 18 through the in-gates 32 and 40 to the die cavities 30 and 38. The hydraulic pressure from the main pressure cylinder 16 that is needed to fill the cavities 30 and 38 is much less than the hydraulic pressure needed from a main pressure cylinder of, for example, a prior art device that only relies upon one pressure source—the main pressure source—to provide pressure during solidifying to reduce the volume of entrapped air and increase the rate of heat transfer during solidifying. The embodiments of the subject application also incorporate moveable cores (squeeze pins) in the form of auxiliary hydraulic cylinders 42 and 44 in each die cavity 30 and 38, respectively. The auxiliary cylinders 42 and 44 are capable of detecting that their respective die cavity 30 and 38 is full, prior to increasing the metal pressure within the cavities 30 and 38.

Embodiments of the subject application also simultaneously actuate the auxiliary hydraulic cylinders 42 and 44 acting as moveable cores to increase metal pressure integral to each die cavity 30 and 38, respectively, which share a common submerged member 52. Thus, embodiments of the subject application illustrate a method of densifying the metal in multiple cavity dies 30, 38 to minimize the main pressure force.

Also, embodiments of the subject application also provide a method of detecting whether die cavities such as cavities 30 and 38 are filled with molten metal 20 by using a moveable core, such as in the form of auxiliary hydraulic cylinders 42 and 44.

The foregoing specific embodiments have been provided to illustrate the structural and functional principles of the present invention, and are not intended to be limiting. To the contrary, the present invention is intended to encompass all modifications, alterations, and substitutions within the scope of the appended claims.

What is claimed is:

1. An engine cradle for a motor vehicle, comprising:
a frame assembly having a pair of spaced rails secured by spaced cross members;
at least one of the spaced rails and the spaced cross members including a composite casting, including:
a steel member;
an end cap fastened to an end portion of the steel member, the end cap including a flange;
the flange of the end cap including one of a circular and a non-circular configuration and notches for providing a mechanical interlock surface, or the flange of the end cap including a polygonal shape for providing a mechanical interlock surface; and
a cast coupling member cast about the end portion of the steel member including the end cap, thereby positively and rigidly securing the cast coupling member to the steel member.

2. The engine cradle as defined in claim 1 wherein the cast coupling member is casted about the end portion of the steel member by casting-in-place aluminum about the end cap and the end portion.

3. The engine cradle as defined in claim 1 wherein the steel member is a tubular member.

4. The engine cradle as defined in claim 1 wherein the flange has one of a circular and a non-circular configuration.

5. The engine cradle as defined in claim 4 wherein the flange has notches for providing a mechanical interlock surface.

6. The engine cradle as defined in claim 1 wherein the flange has a polygonal shape for providing a mechanical interlock surface.

7. The engine cradle as defined in claim 6 wherein the end cap includes an outwardly extending member.

8. An engine cradle for a motor vehicle, comprising:
a frame assembly having a pair of spaced rails secured by spaced cross members;
at least one of the spaced rails and the spaced cross members including a composite casting, including:
a steel member;
an end cap fastened to a portion of the steel member;
a cast coupling member cast about the portion of the steel member including the end cap, thereby positively and rigidly securing the cast coupling member to the steel member; and wherein the end cap about which the cast coupling member is casted is a mid-portion of the steel member and the mid-portion includes a section having a non-circular cross-section.

9. A control arm for a motor vehicle, comprising:
a composite casting including:
a steel member curved in a longitudinal direction;
an end cap fastened to an end portion of the steel member, the end cap including a flange;
the flange of the end cap including one of a circular and a non-circular configuration and notches for providing a mechanical interlock surface, or the flange of the end cap including a polygonal shape for providing a mechanical interlock surface; and
a cast coupling member cast about the end portion of the steel member including the end cap, thereby positively and rigidly securing the cast coupling member to the steel member.

10. The control arm as defined in claim 9 wherein the cast coupling member is casted about the end portion of the steel member by casting-in-place aluminum about the end cap and the end portion.

11. The control arm as defined in claim 9 wherein the steel member is a tubular member.

12. An instrument panel support structure for a motor vehicle, comprising:
a composite casting in the form of a cross beam; and
a mount positioned on each end of the composite casting, the composite casting including:
a steel member;
an end cap fastened to an end portion of the steel member, the end cap including a flange;
the flange of the end cap including one of a circular and a non-circular configuration and notches for providing a mechanical interlock surface, or the flange of the end cap including a polygonal shape for providing a mechanical interlock surface; and
a cast coupling member cast about the end portion of the steel member including the end cap, thereby positively and rigidly securing the cast coupling member to the steel member.

13. The instrument panel support structure as defined in claim 12 wherein the cast coupling member is casted about the end portion of the steel member by casting-in-place aluminum about the end cap and the end portion.

14. The instrument panel support structure as defined in claim 12 wherein the steel member is a tubular member.

15. A bumper assembly for a motor vehicle, comprising:
a composite casting including:
a steel member; and
end caps fastened to end portions of the steel member, at least one of the end caps including a flange;
the flange of the end cap including one of a circular and a non-circular configuration and notches for providing a mechanical interlock surface, or the flange of the end cap including a polygonal shape for providing a mechanical interlock surface; and
cast coupling members cast about the end portions of the steel member including the end caps, thereby positively and rigidly securing the cast coupling members to the steel member, the steel member forming a longitudinally extending steel bumper member constructed to protect the vehicle from impact, and the coupling members forming first and second aluminum members attached to the steel bumper member, wherein the steel bumper member extends between the first and second aluminum members and the first and second aluminum members are positioned between the steel bumper member and the space frame of the vehicle.

16. The bumper assembly as defined in claim 15 wherein the steel member is a tubular member.

17. A twist axle comprising:
a steel torsion beam;
an end cap fastened to an end portion of the steel torsion beam, the end cap including a flange;

the flange of the end cap including one of a circular and a non-circular configuration and notches for providing a mechanical interlock surface, or the flange of the end cap including a polygonal shape for providing a mechanical interlock surface; and a cast trailing arm cast abut the end portion of the steel torsion beam including the end cap, thereby positively and rigidly securing the cast trailing arm to the steel torsion beam.

18. The twist axle as defined in claim 17 wherein the steel torsion beam is a tubular beam.

19. A component for a motor vehicle, comprising:

a steel member;

an end cap fastened to an end portion of the steel member, the end cap including a flange;

the flange of the end cap including one of a circular and a non-circular configuration and notches for providing a mechanical interlock surface, or the flange of the end cap including a polygonal shape for providing a mechanical interlock surface; and a cast coupling member cast about the end portion of the steel member including the end cap, thereby positively and rigidly securing the cast coupling member to the steel member.

20. A component for a motor vehicle, comprising:

a steel member;

an end cap fastened to a portion of the steel member;

a cast coupling member cast about the portion of the steel member including the end cap, thereby positively and rigidly securing the cast coupling member to the steel member; and wherein the end cap about which the cast coupling member is casted is a mid-portion of the steel member and the mid-portion includes a section having a non-circular cross-section.

* * * * *